Dec. 2, 1969  J. C. EDWARDS, SR  3,480,991
GIZZARD SKINNER
Filed Oct. 2, 1967
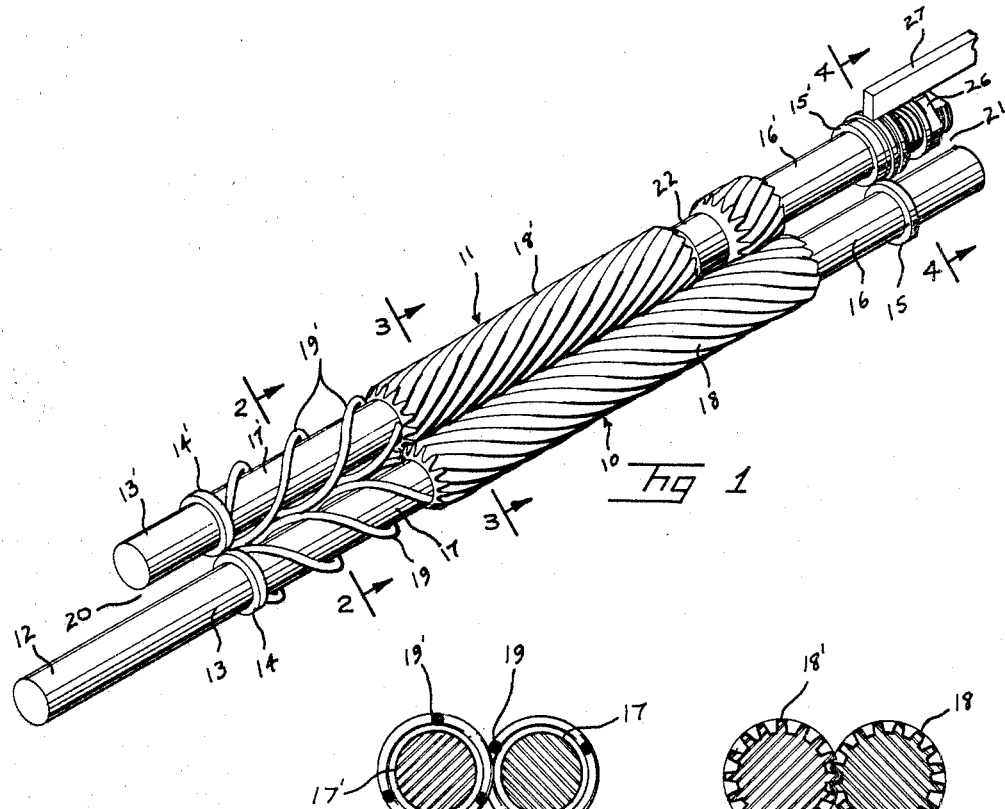
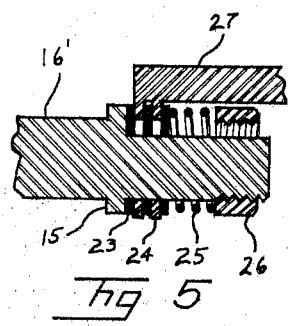 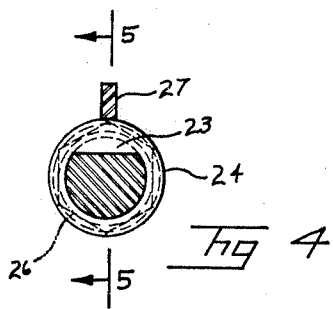
JOHN C. EDWARDS, SR.
INVENTOR.
BY *John J. Mills*
ATTORNEY.

3,480,991
GIZZARD SKINNER
John C. Edwards, Sr., 519 Hilltop Drive,
Raleigh, N.C. 27610
Filed Oct. 2, 1967, Ser. No. 672,033
Int. Cl. A22c 21/00
U.S. Cl. 17—11         6 Claims

ABSTRACT OF THE DISCLOSURE

In abstract, a preferred embodiment of this invention is a pair of rollers for a gizzard splitting and skinning machine which automatically feeds the loose skin of the gizzard into the skinning portion of the rollers to eliminate the auxiliary feeding means heretofore used.

---

This invention relates to poultry processing equipment and more particularly to the rollers used in removing the skin from gizzards in a gizzard splitting and skinning machine.

In the past, various types of gizzard skinning devices have been developed in an effort to produce an efficient, fool proof device which is both economical in production and operation. In these attempts, various means have been developed including various shaped roller devices for gripping the loose skin of a gizzard to remove the same. None of these devices, however, have been satisfactory in actual operation. One of the closest devices to being economical is a device disclosing a pair of meshed rollers having a pushing means or arm associated therewith to feed a gizzard along the rollers as the skin is gripped therebetween. This device is inefficient at best with a loss of anywhere from 12 to 35 or 30 gizzards a minute due to nongripping of the skin or to the gizzards falling behind the arm and being thrown into the waste trough on the arm's return movement. Losses of this magnitude will amount, in a poultry processing plant, to a loss of between $12.00 and $30.00 per hour. Using all new equipment in peak operating adjustment, the prior art devices have not been able to cut the losses to below the above indicated minimums.

Further as the rollers of the prior art devices operate, one being a master and one being a slave, wear between the two, and in the bearings on which they are mounted, cause them to become progressively more inefficient to the point that they must be removed and replaced with a maximum operational life of two months. If, of course, the plant is running two or more shifts a day, this operational life is even less.

The present invention has been developed after much research and study into the above mentioned problems and is designed to automatically feed the loose skin portion of a gizzard into the skinning rollers without the employment of outside feed means. The devices is also designed to accomplish the desired end result while at the same time, for all practical purposes, completely eliminating all losses which have hereinbefore occurred due to operational inefficiency. The device of the present invention is further designed to increase the useful life of the rollers from fifty to one hundred percent while at the same time allowing consistent results during the rollers' operational life by providing means for at all times accurately controlling the gripping action therebetween. The present invention has an additional purpose of eliminating the undesirable build-up of fatty and similar type tissues at the end of the skinning rollers by providing a drop-out area in one roller which is automatically fed by the other roller.

It is, therefore, an object of the present invention to provide means at the feed end of each of a pair of meshing gizzard skinning rollers to move the gizzards into skinning position and to align the loose skin thereon between said rollers.

Another object of the present invention is to provide, in a master-slave type pair of gizzard skinning rollers, a brake means on one end of the slave device to allow accurate control of the tension between such rollers thereby increasing and assuring efficiency of operation as well as increasing the life of the device.

A further object of the present invention is to provide a waste drop-out area adjacent the removal end of a pair of gizzard skinning rollers thereby eliminating the build-up of undesirable foreign matter due to the longitudinal feed action of said rollers.

Another object of the present invention is to provide a variable tensioning means on one of a pair of gizzard skinning rollers thereby allowing a constant tension to be maintained therebetween regardless of the worn condition of the device.

Another object of the present invention is to provide a gizzard skinning device which eliminates all auxiliary feed means ordinarily associated with gizzard skinning rollers.

Other objects and advantages of the present invention will become apparent and obvious from a study of the following description and accompanying drawings which are merely illustrative of the present invention.

In the drawings:

FIG. 1 is a perspective of a pair of gizzard skinning rollers incorporating the present invention;

FIG. 2 is a sectional view taken through lines 2—2 of FIG. 1;

FIG. 3 is a sectional view taken from lines 3—3 of FIG. 1;

FIG. 4 is a sectional view taken from lines 4—4 of FIG. 1; and

FIG. 5 is a sectional view taken from lines 5—5 of FIG. 4.

With further reference to the drawings, FIG. 1 discloses a pair of gizzard skinning rollers comprising a master or drive roller indicated generally at 10 and a slave or driven roller indicated generally at 11. An elongated portion 12 is provided at one end of the drive roller and is adapted to operatively connect with a source of rotative power (not shown). A bearing surface 13 is provided between the elongated portion 12 and a circumventional bearing shoulder 14. A second bearing shoulder 15 is provided at the other end of the master roller with a bearing surface area 16 adjacent thereto.

Spiraling about shaft portion 17 of roller 10 between shoulder 14 and spiral gear portion 18 is fixedly secured feed means 19. This feed means has a pitch considerably larger than the pitch of gear portion 18. Means 19 may be constructed of one or more evenly spaced wires or of two or more wires spaced together in a spiraling configuration. Either of these two ways of forming the feed means may be either tightly wrapped against the shaft portion 17 or may be raised in spaced relation thereto. Further, one or more projections could be fixedly secured or integral with said shaft portion in a spiral configuration to give the same desired result.

Slave or drive roller 11 includes bearing surfaces 13' and 16' at either end with associated circumventional bearing shoulders 14' and 15' respectively. Adapted to operatively engage spiral gear portion 18 is spiral gear portion 18' of said driven roller. Adjacent feed means 19 is feed means 19' of roller 11. Gears 18 and 18' are of opposite spiral configuration as are feed means 19 and 19' so that as a gizzard and associated skin therewith are placed on the two rotating rollers they will move from the feeder end 20 to the removal end 21.

A smooth, nongeared area 22 is provided adjacent the removal end 21 of the driven roller so that any waste materials which is carried to this position by either the gizzards or the rollers will not feed into the bearing surface areas 16 and 16' but will fall through the opening left by the said area and into a waste removal means (not shown). It is to be understood, of course, that although the smooth waste elimination area 22 is disclosed on the driven roller, it could obviously work just as well on the drive roller or, if preferred, could be provided on both rollers.

The portion of roller 11 projecting outwardly from circumventional bearing shoulder 15' is threaded and flattened on one side. A series of washer means 23 are provided having a semicircular opening therein and being adapted to slide onto said flattened portion in such a manner that such washers are removably fixed relative to rotative motion. A second series of washers 24 having circular openings therein are alternately mounted between washers 23. After a desired predetermined number of washers 23 and 24 have been placed on the flattened portion of roller 11, a tensioning means such as a coiled spring 25 is mounted thereon and an adjustable securing means such as a nut 26 is threaded thereon. An antirotation means 27 is provided which is secured to each of the circular centered washers 24. Thus it is obvious that washers 23 will turn with driven roller 11 while washers 24, which are in operative contact with washers 23, will not rotate although the flattened portion of the roller will turn within such washers. As the tensioning adjusting means 26 is moved toward the washers, the friction between alternately mounted washers 23 and 24 is increased through spring 25 thereby giving an increased braking action to rotation of roller 11.

In actual operation of the poultry processing device of the present invention, a gizzard is placed on spiral feed means 19 and 19' of rollers 10 and 11. The loose skin on the gizzard will by gravity and the action of the feed means hang down in the open area between feed means 19, 19' and shafts 17 and 17'. As the gizzard and its associated skin move in a direction from end 20 to end 21 of the rollers, the skin becomes engaged between the spiral teeth of the spiral gear portions 18 and 18'. The spiral shape of these gears causes the gizzard to continue moving toward end 21 while at the same time pulling the skin downward therebetween but not the gizzard due to its size and bulk. Thus it can be seen that by the time the gizzard travels from where the skin first engaged the spiral gears until it reaches the smooth portion 22 of roller 11, all of the skin associated therewith will have been removed. Any matter such as fat, entrails or other waste material which is carried along the rollers, either due to their spiral feed action or is carried or pushed along the traveling gizzard will, when it reaches smooth area 22, be forced by gravity and the action of adjacent gear portion of roller 18 through the two rollers and into a waste container or conveyor means (not shown). Once the cleaned gizzard reaches the removal end 21 of the spiral gears 18 and 18', it may be removed by any convenient means such as automatic or semiautomatic devices or manually.

As the geared portion 18 and 18' of rollers 10 and 11 become worn, the gripping action therebetween becomes progressively less. To compensate for this wear and to maintain a constant gripping action of predetermined strength, an adjusting means such as nut 26 may be turned to thread it toward the alternately mounted washers 23 and 24 thereby increasing the tension on spring 25 which in turn causes greater friction between the rotating washers and the nonrotation washers. This binding action between the washers inhibits the free rotation of roller 11 thereby more firmly engaging the meshing between the geared portions 18 and 18' and any skin which may be therebetween.

Although, in the interest of clarity, mounting bearings for bearing surfaces 13, 13', 16 and 16' as well as a source of rotative power for elongated portion 12 and a means of waste removal have not been shown, it is to be understood that any adequate embodiment of these features may be used to accomplish the desired end result when the disclosure of the present invention is operated as hereinabove described.

It is obvious that the present invention has the advantages of being more accurate and efficient than the prior art devices while at the same time being less expensive to manufacture, install and operate. It also has the advantage of giving for all practical purposes, one hundred percent reliability while allowing accurate and constant control of the relationship between the operating parts. This invention further has the advantage of preventing undesirable clog-up of waste materials by providing means for eliminating the same at the removal end of the skin engaging spiral gears.

The terms "upper," "lower" and so forth have been used herein merely for convenience in the foregoing specification to describe the gizzard skinner and its parts as oriented in the drawings. It is to be understood, however, that these terms are in no way limiting to the invention since the skinner may obviously be disclosed in many different positions when it is in actual use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. In a poultry processing device which uses a pair of meshed spiral gears to grip and remove skin from gizzards, the improvement comprising: a feed end spiraled, outwardly projecting feeder means having a pitch considerably larger than the pitch of the gears connected to and mounted adjacent each of said gears at said end whereby gizzard skins may be fed into and gripped between said gears.

2. The device of claim 1 wherein the feeder means is at least one wire type member spiraled about a shaft fixedly secured to at least one of said gears.

3. The device of claim 1 wherein a removal end is provided opposite said feed end; and a circumventionally disposed smooth area is provided at the removal end of at least one of the spiral gears whereby undesirable material may be allowed to drop between said gears.

4. In a poultry processing device which uses a pair of meshing spiral gears to grip and remove skin from gizzards, the improvement comprising: means for rotatively driving one of the gears whereby the other gear, through meshing action, rotates; and brake means operatively connected to said last mentioned gear whereby the gripping action of the gears on the gizzard skin may be increased.

5. The device of claim 4 wherein a feeder means of spiral configuration is provided adjacent one end of each of said spiral gears whereby the gripping of the gizzard skin may be facilitated.

6. The device of claim 5 wherein a circumventionally disposed smooth area is provided in at least one of the gears at the end opposite the feeder means.

References Cited

UNITED STATES PATENTS

| | | | |
|---|---|---|---|
| 2,620,510 | 12/1952 | Darrow et al. | 17—11 |
| 2,630,599 | 3/1953 | Grant et al. | 17—43 |
| 3,099,038 | 7/1963 | Platt | 17—11 |
| 3,119,144 | 1/1964 | Hill | 17—11 |
| 3,172,148 | 3/1965 | Hill | 17—11 |
| 3,406,425 | 10/1968 | Hill | 17—11 |

LUCIE H. LAUDENSLAGER, Primary Examiner

U.S. Cl. X.R.

17—43